US009785853B2

(12) United States Patent
Duong et al.

(10) Patent No.: US 9,785,853 B2
(45) Date of Patent: *Oct. 10, 2017

(54) DYNAMICALLY ENABLING AN INTERACTIVE ELEMENT WITHIN A NON-INTERACTIVE VIEW OF A SCREEN SHARING SESSION

(71) Applicant: INTERNATIONAL BUSINESS MACHINES CORPORATION, Armonk, NY (US)

(72) Inventors: Quang T. Duong, Austin, TX (US); David M. Gordon, Morrisville, NC (US); David L. Schmidt, Cary, NC (US); Scott A. Will, Wake Forest, NC (US)

(73) Assignee: International Business Machines Corporation, Armonk, NY (US)

( * ) Notice: Subject to any disclaimer, the term of this patent is extended or adjusted under 35 U.S.C. 154(b) by 169 days.

This patent is subject to a terminal disclaimer.

(21) Appl. No.: 14/547,282

(22) Filed: Nov. 19, 2014

(65) Prior Publication Data

US 2015/0237084 A1    Aug. 20, 2015

Related U.S. Application Data

(63) Continuation of application No. 14/185,344, filed on Feb. 20, 2014.

(51) Int. Cl.
*G06K 9/20* (2006.01)
*G06K 9/32* (2006.01)
(Continued)

(52) U.S. Cl.
CPC ............. *G06K 9/2081* (2013.01); *G06F 9/54* (2013.01); *G06F 17/30887* (2013.01);
(Continued)

(58) Field of Classification Search
CPC ... H04N 21/8583; G06F 3/0481; G06F 3/048; G06F 9/4445; H04L 67/14; H04L 67/141;
(Continued)

(56) References Cited

U.S. PATENT DOCUMENTS

2009/0259745 A1* 10/2009 Lee ...................... G06K 9/2072
709/224
2014/0033049 A1* 1/2014 Fitzpatrick ........ G06F 17/30873
715/733

(Continued)

FOREIGN PATENT DOCUMENTS

JP        5299068 B2    9/2013
WO    2013150566 A1    10/2013

OTHER PUBLICATIONS

A method or system for collaborate the shared screen in a web conference, IP.com, IPCOM000226312D, Mar. 27, 2013, Abstract,p. 1, 2, 3.

(Continued)

*Primary Examiner* — Kieu Vu
*Assistant Examiner* — Roberto Borja
(74) *Attorney, Agent, or Firm* — Steven M. Greenberg, Esq.; CRGO Law

(57) ABSTRACT

A non-interactive screen sharing session executing within a computing device can be identified. The device can be communicatively linked to different computing devices of the screen sharing session. The contents of the remote screen buffer can be analyzed to determine a graphical representation of a Uniform Resource Locator (URL) within the contents prior to presenting the contents of the buffer within the device. A visible information item can be extracted and a non-visible reference can be established from the representation. An area surrounding the representation including a position and dimensions of the representation within the contents can be determined. The representation of the URL (Continued)

can be replaced with an interactive element in real-time. The element can include the visible and non-visible reference. The contents of the buffer can be presented within an interface associated with the session of the device, responsive to the replacing.

8 Claims, 3 Drawing Sheets

(51) Int. Cl.
    *G06K 9/46*     (2006.01)
    *H04L 29/08*     (2006.01)
    *G06F 9/54*     (2006.01)
    *G06F 17/30*     (2006.01)
    *G06F 9/44*     (2006.01)

(52) U.S. Cl.
    CPC ........... *G06K 9/2072* (2013.01); *G06K 9/325* (2013.01); *G06K 9/4604* (2013.01); *H04L 67/14* (2013.01); *G06F 9/4443* (2013.01); *G06F 9/4445* (2013.01); *G06K 2209/01* (2013.01); *H04L 67/141* (2013.01)

(58) Field of Classification Search
    CPC .. G06K 9/4604; G06K 9/2072; G06K 9/2081; G06K 9/325; G06K 9/46; G06K 2209/01
    See application file for complete search history.

(56) References Cited

U.S. PATENT DOCUMENTS

| | | | |
|---|---|---|---|
| 2014/0133836 A1* | 5/2014 | Burns | G11B 27/10 386/278 |
| 2014/0337800 A1* | 11/2014 | Gray | G06F 1/1626 715/835 |
| 2015/0103131 A1* | 4/2015 | Denoue | H04N 7/147 348/14.03 |
| 2015/0146982 A1* | 5/2015 | Tsai | G06K 9/2081 382/177 |

OTHER PUBLICATIONS

Method and System for Capturing Content from a Shared Screen in a Web Conference, IPCOM000215516D, Mar. 6, 2012; IP.com; Abstract; p. 1, 2.

\* cited by examiner

DYNAMICALLY ENABLING AN INTERACTIVE ELEMENT WITHIN A NON-INTERACTIVE VIEW OF A SCREEN SHARING SESSION

CROSS-REFERENCE TO RELATED APPLICATIONS

This application is a continuation of U.S. patent application Ser. No. 14/185,344, filed Feb. 20, 2014 (pending), which is incorporated herein in its entirety.

BACKGROUND

The present invention relates to the field of collaborative computing and, more particularly, to dynamically enabling an interactive element within a non-interactive view of a screen sharing session.

Applications such as instant messaging applications and productivity applications can allow users to easily collaborate to perform important tasks. Many times, these applications include collaborative features such as screen sharing and Web conferencing. These features can offer a high degree of collaboration when users interact with other users via a shared screen. Common features of these applications often include a non-interactive mode which permits participants to observe a shared screen without granting access to the shared screen. For example, slideshows are frequently used within Web conferences to quickly communicate complex ideas with a large group of participants. The functionality allows a user to safely and easily share visual content of a computer screen at a particular time. As such, these applications provide an easy way to share complex information between users.

Frequently, however, participants desire to interact with portions of the slideshow which include interactive content (e.g., Uniform Resource Locator). For example, when a URL is presented within a slideshow, participants must manually copy the URL into a Web browser to view the content associated with the URL. That is, participants view a non-interactive image of the interactive content. These current manual approaches are time consuming and error prone. As such, collaborative applications limit the participant capability to interact with valuable information which can lead to significant frustration and a decreased participant experience.

BRIEF SUMMARY

One aspect of the present invention can include a system, a computer program product, an apparatus, and a method for dynamically enabling an interactive element within a non-interactive view of a screen sharing session. A non-interactive screen sharing session executing within a computing device can be identified. The device can be communicatively linked to different computing devices of the screen sharing session. The contents of the remote screen buffer can be analyzed to determine a graphical representation of a Uniform Resource Locator (URL) within the contents prior to presenting the contents of the buffer within the device. A visible information item can be extracted and a non-visible reference can be established from the representation. An area surrounding the representation including position and dimensions of the representation within the contents can be determined. The representation of the URL can be replaced with an interactive element in real-time. The element can include the visible and non-visible reference. The contents of the buffer can be presented within an interface associated with the session of the device, responsive to the replacing.

Another aspect of the present invention can include a computer program product, an apparatus, a method, and a system for dynamically enabling an interactive element within a non-interactive view of a screen sharing session. A collaboration engine can be configured to dynamically replace a graphical representation of URL within the contents of a screen buffer with a visible element and a non-visible element of an interactive element. The replacing can be performed prior to presenting the contents within an interface of a computing device in real-time during a screen sharing session. The interface can be a non-interactive interface presenting the screen buffer of the screen sharing session. A data store can be able to persist a resource mapping, a screen buffer, and/or a URL.

DETAILED DESCRIPTION

Figure 1:
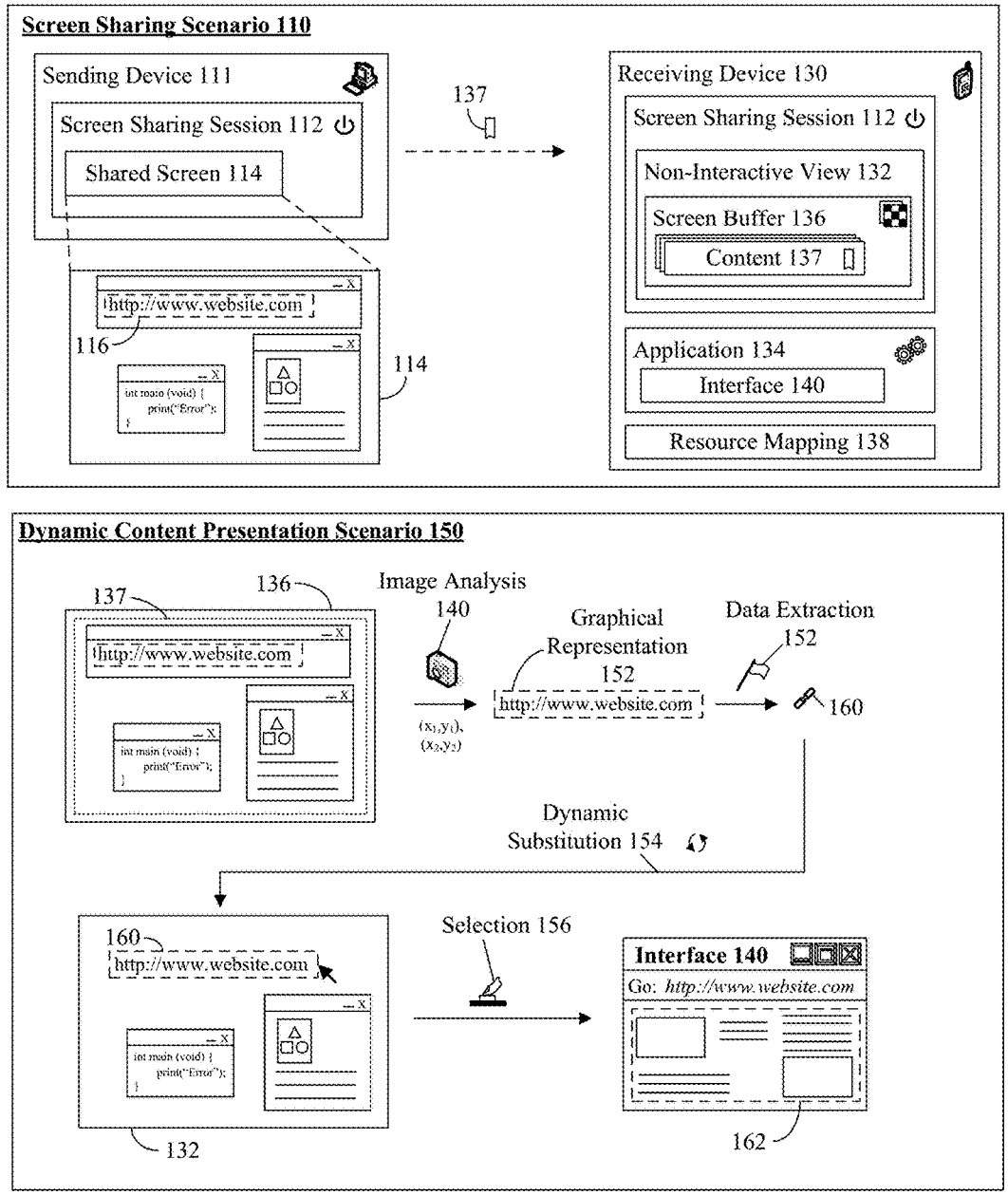
FIG. 1 is a schematic diagram illustrating a set of scenarios for dynamically enabling an interactive element within a non-interactive view of a screen sharing session in accordance with an embodiment of the inventive arrangements disclosed herein.

The present disclosure is a solution for dynamically enabling an interactive element within a non-interactive view of a screen sharing session. In the solution, a sending and receiving computing device can be communicatively linked during a screen sharing session. The receiving device can present a non-interactive view of a shared screen associated with the sending device. The non-interactive view can be dynamically altered to present interactive content when a graphical representation of a URL is detected within the view. In one embodiment, pattern recognition analysis can be leveraged to determine relevant content within a screen buffer of the receiving device. The relevant content can be transformed into an interactive content which can be presented within an interface of the receiving device thus allowing a user at the receiving device to, for example, click on the URL and open a separate browser application.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

FIG. 1 is a schematic diagram illustrating a set of scenarios 110, 150 for dynamically enabling an interactive element within a non-interactive view of a screen sharing session in accordance with an embodiment of the inventive arrangements disclosed herein. In scenario 110, a sending device 111 and a receiving device 130 can be communicatively linked during a screen sharing session 112. When a Uniform Resource Locator (URL) 116 is presented within shared screen 114 of device 111, an interactive element corresponding to the URL 116 can be presented within non-interactive view 132 of device 130. That is, non-interactive view 132 can have selectively interactive portions. For example, session 112 can be a Web-based slideshow presentation with an interactive slide content such as an embedded video.

In scenario 110, a shared screen 114 can include one or more URLs 116 which can be interacted with by one or more users of device 111. For example, screen 114 can include a desktop screen with three visible applications, each presenting content such as source code text, a Web site URL, and an image. Screen 114 can be shared with device 130 within session 112 as non-interactive view 132. Non-interactive view 132 can include a screen buffer 136 which can include content 137. Content 137 can include a graphical rendering of screen 114. For example, content 137 can be an image of the screen 114 at the beginning of a session (e.g., initial screen capture). Content 137 can be continuously conveyed to device 130 responsive to screen 114 changes.

In scenario 150, a content 137 can be presented within a screen buffer 136 of device 130. During session 112, image analysis 140 can be continuously performed to obtain a graphical representation 152 within content 137. Representation 152 can be an image of a URL 116 such as a bitmap. Representation 152 can be determined utilizing traditional and/or proprietary pattern matching techniques. In one instance, representation 152 can be identified using regular expression matching during image analysis 140. In the instance, optical character recognition can determine specially formatted text strings (e.g., URIs) which can be matched against traditional and/or proprietary expressions. That is, the disclosure can be highly configurable enabling customized selection and/or identification of graphical representations of URIs.

Data extraction 152 can be performed to extract visible information and/or a non-visible reference of the representation 152. In one instance, extraction can determine visible and/or non-visible reference from optical character recognition. In the embodiment, when a URL is determined, the text and link information of the representation can be extracted to create an interactive element 160.

In one instance, element 160 can replace the graphical representation 152 within the buffer 136 during a dynamic substitution 154 action. In the instance, element 160 can be visually presented within the non-interactive view 132 instead of representation 152. For example, element 160 can be overlaid onto representation 152 within buffer 136 which can be presented during rendering content 137.

In one embodiment, element 160 can be associated with a resource mapping 138 to enable element 160 to function similar to a URL 116. In the embodiment, mapping 138 can be an index which can link an element 160 with an application 134 which can be executed to present and/or process resource 162.

In one embodiment, interactive element 160 can be a hyperlink which can be associated with a resource 162. In the embodiment, selection 156 of the element 160 can trigger the presentation of a resource 162 within an interface 140. For example, when a mouse click is registered within the interactive region of the hyperlink (e.g., element 160), a Web browser can present a Web site (e.g., resource 162).

It should be appreciated that URL 116 and/or representation 152 can include text content, video content, image content, audio content, and the like. It should be understood that element 160 can visually replicate representation 152 within view 132. That is, element 160 can appear visually similar to traditional interactive content such as images and/or video.

In one embodiment, the disclosure can be utilized to provide interactivity with embedded content within a screen sharing session. In one instance, the disclosure can be realized within a client side solution as described herein. In another instance, the disclosure can be embodied within a server side architecture (e.g., system 300, engine 320).

It should be appreciated that, session 112 can be initiated in a traditional and/or proprietary manner. For example, session 112 can be initiated from an email invitation for a Web conference. Session 112 can be associated with encryption, login authentication, access list mechanisms, expiration limitations, and the like.

It should be appreciated that the disclosure can be utilized to match visual patterns including, but not limited to, traditional chroma schemes, non-traditional schemes, and the like. For example, the disclosure can be configured to detect traditional Web browser links which can appear as a blue underlined portion of text.

Drawings presented herein are for illustrative purposes only and should not be construed to limit the invention in any regard. It should be appreciated that calculation of representation 152 dimension and/or position can be performed utilizing traditional and/or proprietary mechanisms. In one embodiment, the functionality described herein can be a capability of a slideshow presentation application. It should be appreciated that screen 114 can include one or more relevant content (e.g., URL 116). It should be appreciated that the disclosure is not limited to hyperlinks and can support XLINKs.

As used herein, resource 162 can be a digital resource which can be accessed via a computing device. Resource 162 can include, but is not limited to, a document, a task, an application, a device, a bookmark, a Web page, a Web form, and the like. In one embodiment, the disclosure can utilize traditional and/or proprietary remote access protocol. In the embodiment, protocols can include, but is not limited to, Remote Frame Buffer (RFB) protocol, Session Initiated Protocol, and the like. It should be understood that screen buffer can be a component of a windowing system such as a desktop windowing manager.

Figure 2:
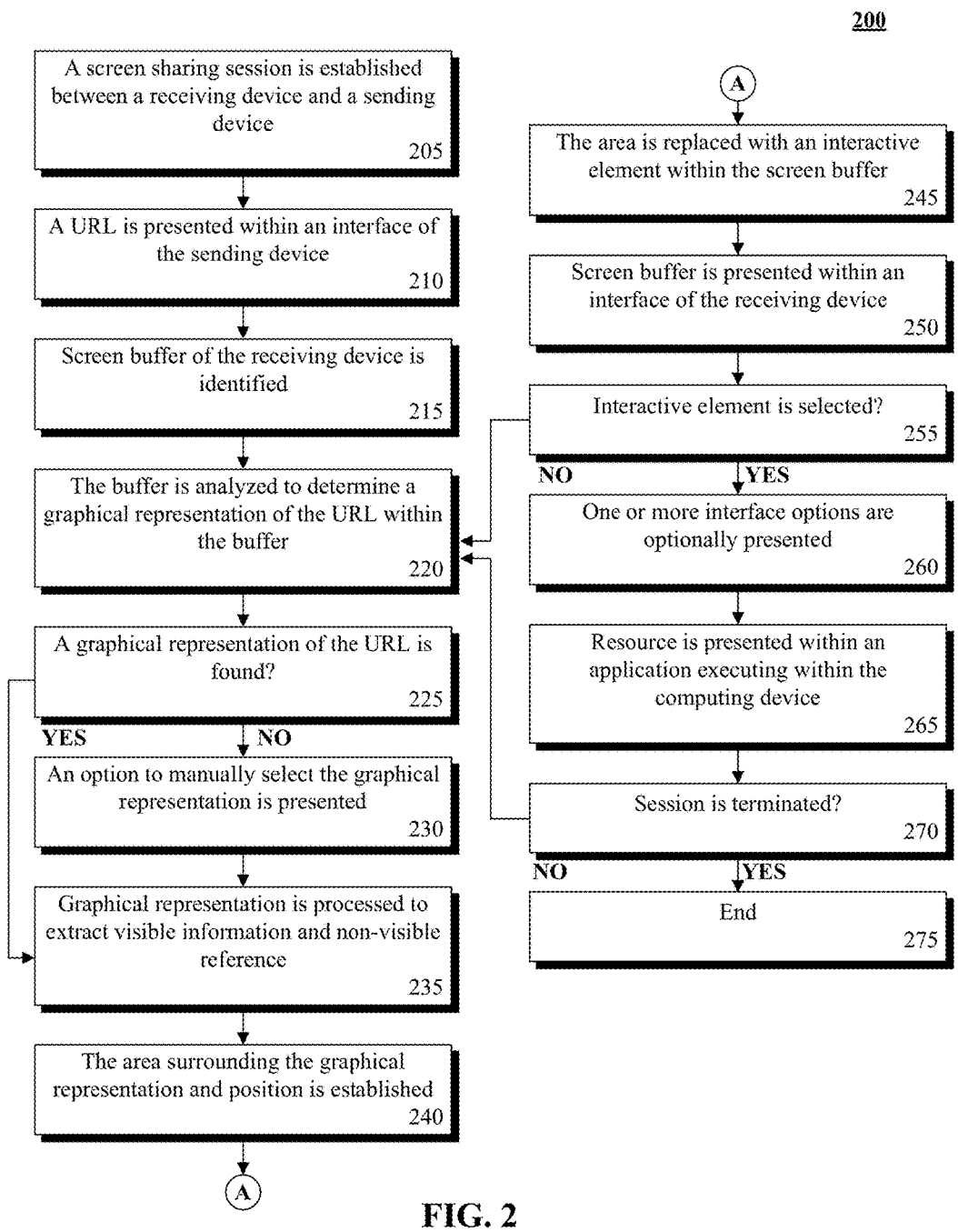
FIG. 2 is a schematic diagram illustrating a method for dynamically enabling an interactive element within a non-interactive view of a screen sharing session in accordance with an embodiment of the inventive arrangements disclosed herein.

FIG. 2 is a schematic diagram illustrating a method 200 for dynamically enabling an interactive element within a non-interactive view of a screen sharing session in accordance with an embodiment of the inventive arrangements disclosed herein. In method 200, a screen buffer can be analyzed to determine a specially formatted string which can be transformed into an interactive content within a non-interactive view of a screen sharing session.

In step 205, a screen sharing session can be established between a receiving device and a sending device. In step 210, a Uniform Resource Identifier (URL) can be presented within an interface of the sending device. For example, a URL of a Website can be presented within a navigation bar of a Web browser. In step 215, a screen buffer of the receiving device can be identified. The buffer can be identified utilizing traditional resource identification schemes. In step 220, the buffer can be analyzed to determine a graphical representation of the URL within the buffer. In step 225, if a graphical representation of the URL is found, the method can continue to step 235, else proceed to step 230. In step 230, an option to manually select the graphical representation can be presented. The manual option can include a traditional and/or proprietary selection tool such as a lasso, a rectangle selection tool (e.g., visible marquee), and the like.

In step 235, a graphical representation can be processed to extract visible information and a non-visible reference. In step 240, the area surrounding the graphical representation and position can be established. Step 240 can be performed utilizing feature detection, edge detection, and the like. In step 245, the area can be replaced with an interactive element within the screen buffer. In step 250, the screen buffer can be presented within an interface of the receiving device. In step 255, if the interactive element is selected the method can continue to step 260, else return to step 220. In step 260, one or more interface options can be optionally presented. Interface options can include, but are not limited to, copying the interactive element, copying element information, executing interactive element, setting element application association, and the like. In step 265, the resource can be presented within an application executing within the computing device. In step 270, if the session is terminated the method can continue to step 275, else return to step 220. In step 275, the method can end.

Drawings presented herein are for illustrative purposes only and should not be construed to limit the invention in any regard. It should be appreciated that method 200 can include one or more optional steps permitting the functionality of the method 200 is retained. Method 200 can be performed in serial and/or in context. Method 200 can be performed in real-time or near real-time.

Figure 3:
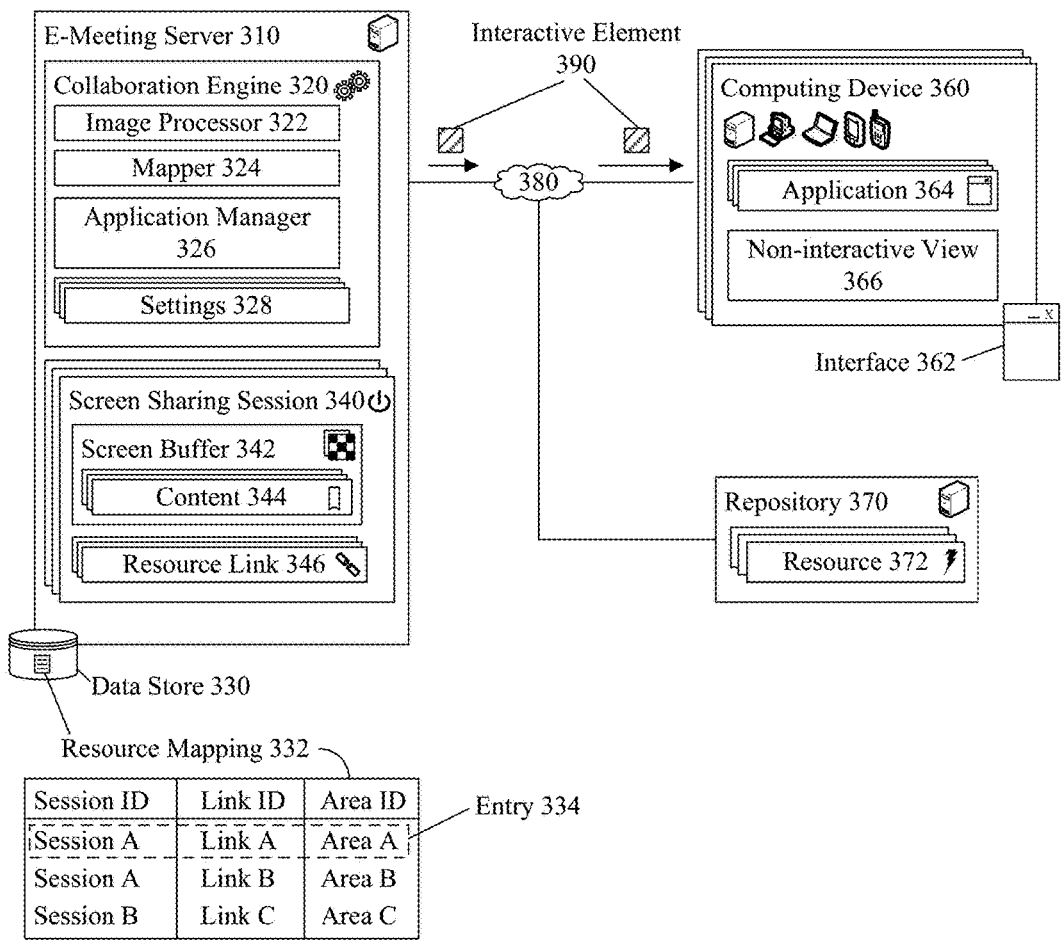
FIG. 3 is a schematic diagram illustrating a system for dynamically enabling an interactive element within a non-interactive view of a screen sharing session in accordance with an embodiment of the inventive arrangements disclosed herein.

FIG. 3 is a schematic diagram illustrating a system 300 for dynamically enabling an interactive element within a non-interactive view of a screen sharing session in accordance with an embodiment of the inventive arrangements disclosed herein. In system 300, a collaboration engine 320 can enable link 346 within a screen buffer 342 to be dynamically adjusted to enable an interactive element 390 to be presented within a non-interactive view 366 of screen sharing session. System 300 components 320, 360, 370 can be communicatively linked via one or more networks 380.

E-meeting server 310 can be a hardware/software for executing a collaboration engine 320. Server 310 functionality can include, but is not limited to, encryption, file sharing, and the like. Server 310 can include, but is not limited to, collaboration engine session 340, data store 330, an interface, and the like. In one instance, server 310 can be associated with a Web conferencing session.

Collaboration engine 320 can be a hardware/software element for dynamically enabling interactive interface elements within a non-interactive view 366 of screen sharing session. Engine 320 functionality can include, but is not limited to, session management, screen buffer synchronization, and the like. Engine 320 can include, but is not limited to, image processor 322, mapper 324, application manager 326, settings 328 and the like. In one instance, engine 320 can be a functionality of a Web browser plug-in. In another instance, functionality of engine 320 can be present within an Application Programming Interface (API).

Image processor 322 can be a hardware/software entity for determining a resource link 346 within content 344 of buffer 342. Processor 322 functionality can include, but is not limited to, pattern recognition, semantic processing, and the like. In one embodiment, processor 322 can perform optical character recognition to determine specially formatted text strings to within content 344. For example, processor 322 can be utilized to identify and extract a Uniform Resource Locator address within screen buffer 342. It should be appreciated that processor 322 can perform pre-processing and/or post-processing functions to improve processing accuracy and/or efficiency. In one embodiment, processor 322 can include a pattern matcher functionality, enabling custom patterns to be manually and/or automatically managed. For example, a user interface can permit processor 322 to be configured to detect image links by establishing a pattern to detect a blue border around an image.

Mapper 324 can be a hardware/software element for correlating properties of content 344 with a resource link 346. Mapper 324 functionality can include, but is not limited to, content position determination, content dimension estimation, and the like. In one instance, mapper 324 can utilize resource mapping 332 to permit dynamic link 346 tracking and/or presentation. For example, entry 334 can enable a Link A to be associated with an Area A of a screen buffer within a session A. In one embodiment, mapping 324 can detect when resource link 346 overlaps with other content 344. In the embodiment, mapping 324 can utilize boundary detection to enable resource link 346 identification and/or extraction.

Application manager 326 can be a hardware/software entity for presenting a resource 372 associated with a resource link 346. Manager 326 functionality can include, but is not limited to, application 364 selection, application authorization, application registration, and the like. In one embodiment, manager 326 can enable an application external to session 340 to present a resource 372.

Settings 328 can be one or more rules for establishing the behavior of system 300, engine 320, and the like. Settings 328 can include, but is not limited to, image processor 322, mapper 324, application manager 326, and the like. In one instance, settings 328 can be manually and/or automatically established. In the embodiment, settings 328 can be heuristically established based on historic settings. Settings 328 can be persisted within data store 330, computing device 360, and the like.

Data store 330 can be a hardware/software component able to persist table 332, settings 328, and the like. Data store 330 can be a Storage Area Network (SAN), Network Attached Storage (NAS), and the like. Data store 330 can conform to a relational database management system (RDBMS), object oriented database management system (OODBMS), and the like. Data store 330 can be communicatively linked to engine 320 in one or more traditional and/or proprietary mechanisms. In one instance, data store 330 can be a component of Structured Query Language (SQL) complaint database.

Resource mapping 332 can be one or more data sets for enabling interactive content within a non-interactive view 366. Mapping 332 can include, but is not limited to, a session identifier, a link identifier, an area identifier, a time stamp, a coordinate, a dimension, and the like. In one instance, mapping 332 can be conformed to an Extensible Markup Language format, Hypertext Markup Language format, and the like. In one embodiment, mapping 332 can be dynamically and/or manually generated.

Screen sharing session 340 can be semi-permanent exchange interactive information interchange between one or more computing devices 360, server 310, and/or repository 370. Session 340 can include, but is not limited to, a screen buffer 342, a resource link 346, and one or more non-interactive views. Screen buffer 342 can be a part of computer memory used by a computer application (e.g., application 364) for the representation of the content 344 to be shown on the computer display (e.g., interface 362). Screen buffer can include a video buffer, a regeneration buffer, virtual frame buffer, remote frame buffer, and the like. Resource link 346 can be a Uniform Resource Identifier associated with a resource 372. In one instance, session 340 can utilize an OCR-A, OCR-B, and the like to ensure high accuracy from image processing.

Computing device 360 can be a software/hardware element for executing application 364 and/or non-interactive view 366. Device 360 can include, but is not limited to, input components (e.g., keyboard), interface 362, an application 364, output components (e.g., display), and the like. Device 360 hardware can include, but is not limited to, a processor, a non-volatile memory, a volatile memory, a bus, and the like. Computing device 360 can include, but is not limited to, a desktop computer, a laptop computer, a mobile phone, a mobile computing device, a tablet computing device, a PDA, and the like. Interface 362 capabilities can include a graphical user interface (GUI), voice user interface (VUI), mixed-mode interface, and the like. Application 364 can include, but is not limited to, a desktop application, a mobile application, and the like. In one embodiment, device 360 can present a non-interactive view 366 of session 340. In the embodiment, view 366 can be presented within an interface 362.

Repository 370 can be a hardware/software entity for persisting and/or exposing resource 352. Repository 370 can include, but is not limited to, an application server, a database server, a Web server, digital asset management server, and the like. In one instance, repository 370 can be a component of a server 310, device 360, and the like. In one embodiment, repository 370 can be a remote communicatively linked computing device. Repository 372 can include, but is not limited to, resource 372, repository settings, and the like. Resource 372 can include, but is not limited to, a binary content a plain text content, and the like Resource 372 can include, but is not limited to, an audio file, a video file, an image, a Hypertext Markup Language document, an Extensible Markup Language document, a source code file, and the like.

Network 380 can be an electrical and/or computer network connecting one or more system 300 components. Network 380 can include, but is not limited to, twisted pair cabling, optical fiber, coaxial cable, and the like. Network 380 can include any combination of wired and/or wireless components. Network 380 topologies can include, but is not limited to, bus, star, mesh, and the like. Network 380 types can include, but is not limited to, Local Area Network (LAN), Wide Area Network (WAN), VPN and the like.

Drawings presented herein are for illustrative purposes only and should not be construed to limit the invention in any regard. It should be appreciated that one or more components within system 300 can be optional components permitting that the disclosure functionality be retained. It should be understood that engine 320 components can be optional components providing that engine 320 functionality is maintained. It should be appreciated that one or more components of engine 320 can be combined and/or separated based on functionality, usage, and the like. System 300 can conform to a Service Oriented Architecture (SOA), Representational State Transfer (REST) architecture, and the like.

The flowchart and block diagrams in the FIGS. 1-3 illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method for providing interactivity for a "view only" teleconference session comprising:
   establishing a non-interactive screen sharing session between a Web browser executing in memory of a receiving computing device and a sending computing device;
   identifying a screen buffer for the Web browser;
   analyzing the contents of the screen buffer to determine a graphical representation of a Uniform Resource Locator (URL) disposed within the contents prior to presenting the contents of the screen buffer within the Web browser executing in the memory of the computing device;
   processing the graphical representation in the screen buffer so as to extract visible information and a non-visible reference the combination forming the URL;
   determining an area surrounding the graphical representation comprising of a position and dimensions of the graphical representation within the contents utilizing feature detection and edge detection;
   replacing the graphical representation of the URL in the screen buffer with an interactive element in real-time, wherein the interactive element when selected transmits a request by the Web browser to retrieve a Web page at the URL;
   responsive to the replacing, presenting the contents of the screen buffer within the Web browser; and,
   on condition that the graphical representation of the URL is not determined during the analyzing, presenting the contents of the screen buffer within the Web browser and a manual option to select the graphical representation, the manual option being a selection tool, a user manually selecting the graphical representation of the URL using the selection tool upon the contents of the screen buffer once presented in the Web browser and then performing the processing, determining, replacing and presenting.

2. The method of claim 1, further comprising:
   associating the interactive element with an application executing within the computing device, wherein the application is external to the session.

3. The method of claim 1, further comprising:
   programmatically interpreting or accessing a resource associated with the interactive element within an application.

4. The method of claim 1, further comprising
   presenting at least one interface option within the Web browser responsive to selecting the interface element.

5. The method of claim 1, further comprising:
   replacing the visible information with a previously determined text.

6. The method of claim 1, wherein the non-interactive screen sharing session is at least one of a slide show presentation or a whiteboard presentation.

7. The method of claim 1, wherein the interactive element is an image associated with the URL that is associated with a networked resource, a phone number, or an email address.

8. The method of claim 1, further comprising:
   determining a change in at least one of the position and dimension of the area surrounding the graphical representation of the URL; and
   dynamically updating the interactive element within the remote screen buffer correspondingly.

* * * * *